(12) United States Patent
Garver

(10) Patent No.: US 9,394,046 B2
(45) Date of Patent: Jul. 19, 2016

(54) FLUID INTERFACE DEVICE AS WELL AS APPARATI AND METHODS INCLUDING SAME

(71) Applicant: Theodore M. Garver, Springboro, PA (US)

(72) Inventor: Theodore M. Garver, Springboro, PA (US)

(73) Assignee: Ecological Energy Company, Canfield, OH (US)

( * ) Notice: Subject to any disclaimer, the term of this patent is extended or adjusted under 35 U.S.C. 154(b) by 636 days.

(21) Appl. No.: 13/679,373

(22) Filed: Nov. 16, 2012

(65) Prior Publication Data

US 2013/0121826 A1 May 16, 2013

Related U.S. Application Data

(60) Provisional application No. 61/560,520, filed on Nov. 16, 2011.

(51) Int. Cl.
*B64C 23/02* (2006.01)
*F03D 1/06* (2006.01)
*B64C 3/50* (2006.01)

(52) U.S. Cl.
CPC . *B64C 23/02* (2013.01); *B64C 3/50* (2013.01); *F03D 1/0675* (2013.01); *F05B 2240/31* (2013.01); *Y02E 10/721* (2013.01); *Y02T 50/145* (2013.01)

(58) Field of Classification Search
CPC ......... B64C 23/02; B64C 3/50; F03D 1/0675; F05B 2240/31; Y02T 50/145; Y02E 10/721
USPC ............ 415/5; 416/131, 132 R, 132 A, 132 B
See application file for complete search history.

(56) References Cited

U.S. PATENT DOCUMENTS

| | | | |
|---|---|---|---|
| 1,674,169 A | 6/1928 | Flettner |
| 1,785,300 A | 12/1930 | Castelcicala |
| 1,796,860 A | 3/1931 | Bowers |
| RE18,122 E | 7/1931 | Flettner |
| 1,840,594 A | 1/1932 | Minor |
| 2,026,482 A | 8/1933 | Mattioli |
| 1,927,538 A | 9/1933 | Zaparka |
| 2,036,905 A | 4/1936 | Weick |
| 2,157,281 A | 5/1939 | Coanda |
| 2,358,985 A | 9/1944 | McAndrew |

(Continued)

FOREIGN PATENT DOCUMENTS

| | | |
|---|---|---|
| CA | 2022087 | 7/1992 |
| CA | 2134197 | 4/1993 |

(Continued)

*Primary Examiner* — Christopher Verdier
*Assistant Examiner* — Adam W Brown
(74) *Attorney, Agent, or Firm* — Fay Sharpe LLP

(57) ABSTRACT

A fluid interface device, such as an airfoil assembly, can include a device structure and at least one movable band oriented such that the band moves in a direction of fluid flow. The at least one movable band can be supported on the device structure such that an outer surface of the movable band is exposed along the device structure and is capable of movement relative thereto such that a relative velocity can be maintained between the outer surface and the device structure. The fluid interface device can also include an edge extension disposed along the leading edge of the device structure. An airplane, a wind turbine and a method are also included.

20 Claims, 8 Drawing Sheets

(56) References Cited

U.S. PATENT DOCUMENTS

| | | |
|---|---|---|
| 2,399,648 A | 5/1946 | Love |
| 2,622,686 A | 12/1952 | Chevreau |
| 2,716,460 A | 8/1955 | Young |
| 3,128,966 A | 4/1964 | Alvarez-Calderon |
| 3,140,065 A | 7/1964 | Alvarez-Calderon |
| 3,179,354 A | 4/1965 | Alvarez-Calderon |
| 3,195,836 A | 7/1965 | Alvarez-Calderon |
| 3,223,356 A | 12/1965 | Alvarez-Calderon |
| 3,488,714 A | 1/1970 | Brooks |
| 4,100,876 A | 7/1978 | Feleus |
| 4,288,200 A | 9/1981 | O'Hare |
| 4,297,076 A | 10/1981 | Donham et al. |
| 4,323,209 A | 4/1982 | Thompson |
| 4,366,386 A | 12/1982 | Hanson |
| 4,582,013 A | 4/1986 | Holland, Jr. |
| 4,710,101 A | 12/1987 | Jamieson |
| 4,813,631 A | 3/1989 | Gratzer |
| 5,096,378 A | 3/1992 | Jamieson |
| 5,180,119 A | 1/1993 | Picard |
| 5,181,678 A | 1/1993 | Widnall |
| 5,230,486 A | 7/1993 | Patterson |
| 5,518,367 A | 5/1996 | Verastegui |
| 5,730,581 A | 3/1998 | Buter et al. |
| 5,803,409 A | 9/1998 | Keefe |
| 6,322,024 B1 | 11/2001 | Garver |
| 6,375,424 B1 | 4/2002 | Scarpa |
| 6,431,498 B1 | 8/2002 | Watts |
| 6,622,973 B2 | 9/2003 | Al-Garni et al. |
| 6,752,595 B2 | 6/2004 | Murakami |
| 6,824,109 B2 | 11/2004 | Garver |
| 6,972,498 B2 | 12/2005 | Jamieson et al. |
| 7,118,338 B2 | 10/2006 | Moroz et al. |
| 7,131,812 B2 | 11/2006 | Brueckner |
| 7,278,825 B2 | 10/2007 | Segota et al. |
| 7,344,353 B2 | 3/2008 | Naskali et al. |
| 7,731,128 B2 | 6/2010 | Overbergh |
| 8,011,886 B2 | 9/2011 | Subramanian |
| 8,256,719 B2 | 9/2012 | Wood |
| 8,535,008 B2 | 9/2013 | Dewar |
| 2002/0179777 A1 | 12/2002 | Al-Garni et al. |
| 2003/0123973 A1 | 7/2003 | Murakami |
| 2003/0138315 A1 | 7/2003 | Brueckner |
| 2005/0008488 A1 | 1/2005 | Brueckner |
| 2005/0276696 A1 | 12/2005 | LeMieux |
| 2006/0002794 A1 | 1/2006 | Moroz |
| 2006/0045743 A1 | 3/2006 | Bertolotti |
| 2006/0093483 A1 | 5/2006 | Brueckner |
| 2006/0257240 A1 | 11/2006 | Naskali et al. |
| 2007/0046029 A1 | 3/2007 | Murakami et al. |
| 2009/0148290 A1 | 6/2009 | Garver |
| 2011/0135477 A1* | 6/2011 | Mohammed et al. ........... 416/91 |
| 2013/0056585 A1 | 3/2013 | Sandin |
| 2013/0299643 A1 | 11/2013 | Dorsett |
| 2014/0061387 A1 | 3/2014 | Reckzeh |

FOREIGN PATENT DOCUMENTS

| | | |
|---|---|---|
| CN | 102345570 | 7/2015 |
| DE | 19859041 | 12/1998 |
| FR | 446719 | 12/1912 |
| FR | 614091 | 4/1926 |
| FR | 1006698 | 2/1948 |
| FR | 1053332 | 2/1954 |
| GB | 289517 | 1/1927 |
| GB | 519882 | 4/1940 |
| GB | 918325 | 7/1961 |
| GB | 2185788 | 1/1987 |
| JP | 2002-284096 A | 10/2002 |

* cited by examiner

FLUID INTERFACE DEVICE AS WELL AS APPARATI AND METHODS INCLUDING SAME

This application claims the benefit of U.S. Provisional Application No. 61/560,520, filed Nov. 16, 2012, the entire contents of which is hereby incorporated herein by reference.

BACKGROUND

The subject matter of the present disclosure broadly relates to the art of fluid interface devices, such as airfoil structures, for example, use in connection with the relative movement of fluid, and, more particularly, to a fluid interface device that includes an edge extension supported adjacent one or more movable bands and operative to influence fluid flow along the one or more movable bands.

The subject matter of the present disclosure finds particular application and use in connection with airfoil structures, such as wings of aircraft and blades of wind turbines, and is shown and described herein with particular reference thereto. It will be appreciated, however, that the subject matter of the present disclosure is amenable to use in a variety of other applications and/or environments, such as air moving devices (e.g., fans) and other power generation systems (e.g., turbines), for example. As such, it is to be understood that the specific reference herein to use on and/or in association with aircraft wings and wind turbines is merely exemplary of such use and is not intended to be in any way limiting.

The use of fluid interface devices, such as aircraft wings and wind turbine blades, for example, to convert forces imparted by fluid flowing along or across a fluid interface device into forces useful for performing work are well known. Nonetheless, efforts to improve the performance of such fluid interface devices continue to be made. One example of such an effort relates to a construction for improving the performance of aircraft, and is disclosed in U.S. Pat. No. 6,824,109 to Garver. Another example of such an effort relates to a construction for improving the performance of wind turbines, and is disclosed in U.S. Patent Application Publication 2009/0148290 to Garver.

Notwithstanding the prior development and overall success of the aforementioned constructions, it is believed desirable to continue to develop fluid interface devices, such as an airfoil structure for an airplane or a wind turbine, for example, and methods of assembly that further advance the art of known fluid interface devices.

INCORPORATION BY REFERENCE

The entire contents of the following documents are hereby incorporated herein by reference:

U.S. Pat. No. 6,824,109, which issued on Nov. 30, 2004, entitled LIFT ADJUSTING DEVICE FOR AIRCRAFT by Garver; and, U.S. Patent Application Publication No. 2009/0148290, which was filed as U.S. Ser. No. 12/372,371 on Feb. 17, 2009 and published on Jun. 11, 2009, entitled WIND TURBINE AND METHOD OF OPERATING SAME by Garver.

BRIEF DESCRIPTION

One example of a fluid interface device in accordance with the subject matter of the present disclosure can include a device structure for use in a fluid such that relative movement between the fluid interface device and the fluid can result in a fluid flow across the fluid interface device such that the fluid flow can have a flow direction. The fluid interface device can also include at least one movable band oriented such that the band moves in the flow direction. The at least one movable band supported on the device structure such that a first outer surface of the at least one movable band is exposed along the device structure and is capable of movement relative thereto such that a relative velocity can be maintained between the first outer surface and the device structure. An edge extension including a longitudinal edge and supported along at least a portion of said movable band such that the longitudinal edge of the edge extension can function as a leading edge of at least a portion of fluid interface device.

One example of an airfoil assembly in accordance with the subject matter of the present disclosure, which can be suitable for use in a gaseous fluid, can include an airfoil structure and a fluid interface device. The airfoil structure can have a longitudinal length and can include a first longitudinal edge, a second longitudinal edge spaced laterally from the first longitudinal edge, a first side extending longitudinally along at least a portion of the length between the first and second longitudinal edges, and a second side extending longitudinally along at least a portion of the length between the first and second longitudinal edges and generally opposite the first side. The fluid interface device can be operatively associated with the airfoil structure and can include an movable band and an edge extension. The movable band can have a width and be supported on the airfoil structure such that at least a portion of the movable band is exposed along at least one of the first and second sides of the airfoil structure. The edge extension can include a longitudinal edge and can be supported along the first longitudinal edge of the airfoil structure in approximate alignment with at least a portion of the movable band such that relative movement between the airfoil assembly and a gaseous fluid can result in a gaseous fluid flow across the airfoil assembly with the longitudinal edge of the edge extension functioning as a leading edge of at least a portion of the airfoil assembly.

One example of an aircraft in accordance with the subject matter of the present disclosure can include such an airfoil assembly.

One example of a wind turbine in accordance with the subject matter of the present disclosure can include such an airfoil assembly.

One example of a method of assembling an airfoil assembly in accordance with the subject matter of the present disclosure can include providing an airfoil structure that has a longitudinal length and that includes a first longitudinal edge, a second longitudinal edge spaced laterally from the first longitudinal edge, a first side extending longitudinally along at least a portion of the length between the first and second longitudinal edges, and a second side extending longitudinally along at least a portion of the length between the first and second longitudinal edges and generally opposite the first side. The method can also include forming a fluid interface device along at least a portion of the longitudinal length of the airfoil structure. In some cases, forming the fluid interface device can include providing a movable band having a width, and supporting the movable band on the airfoil structure such that at least a portion of the movable band is exposed along at least one of the first and second sides of the airfoil structure. Additionally, forming the fluid interface device can include providing an edge extension that includes a longitudinal edge, and securing the edge extension along the first longitudinal edge of the airfoil structure in approximate alignment with at least a portion of the movable band such that relative movement between the airfoil assembly and a gaseous fluid can result in a gaseous fluid flow across the airfoil assembly with the longitudinal edge of the edge extension functioning as a leading edge of at least a portion of the airfoil assembly.

DETAILED DESCRIPTION

Referring now in greater detail to the drawings, it is to be understood that the illustrations reference herein are for the purposes of demonstrating examples of embodiments of the subject matter of the present disclosure and that these illustrations and examples are not intended to be in any way limiting. Additionally, it should be recognized and appreciated that the drawings are not to scale and that the proportion of certain features and/or elements may be exaggerated for purposes of clarity and ease of understanding.

A fluid interface device in accordance with the subject matter of the present disclosure is generally adapted for use in association with fluid such that relative movement between the fluid interface device and the fluid can result in a fluid flow across the fluid interface device. In generally, the fluid flow will have a flow direction in relation to this relative movement and can cause a net force (e.g., lift) to act on the fluid interface device in a direction transverse (e.g., perpendicular) to the flow direction. One example of a structure in connection with which a fluid interface device according to the present concept can be used is of a type broadly referred to as an airfoil. Typically, an airfoil has opposing sides that, in cross section, have different lateral lengths that can act to generate the net force acting on the airfoil, such as is commonly found on aircraft (e.g., airplanes, manned or unmanned aerial vehicles), wind turbines and a variety of other structures and devices.

Figure 1:
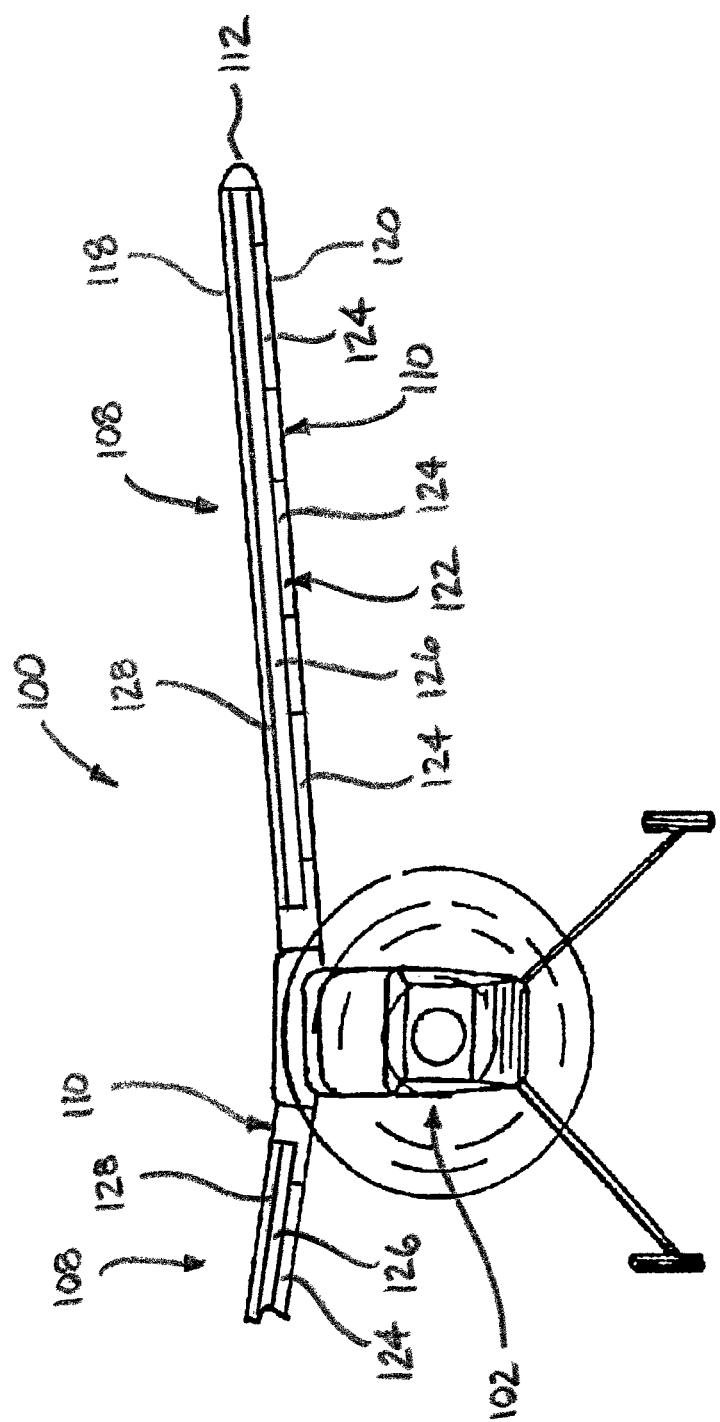
FIG. 1 is a front view of an aircraft that includes fixed wings with one example of a fluid interface device in accordance with the subject matter of the present disclosure that includes a plurality of movable bands and an edge extension.
Figure 2:
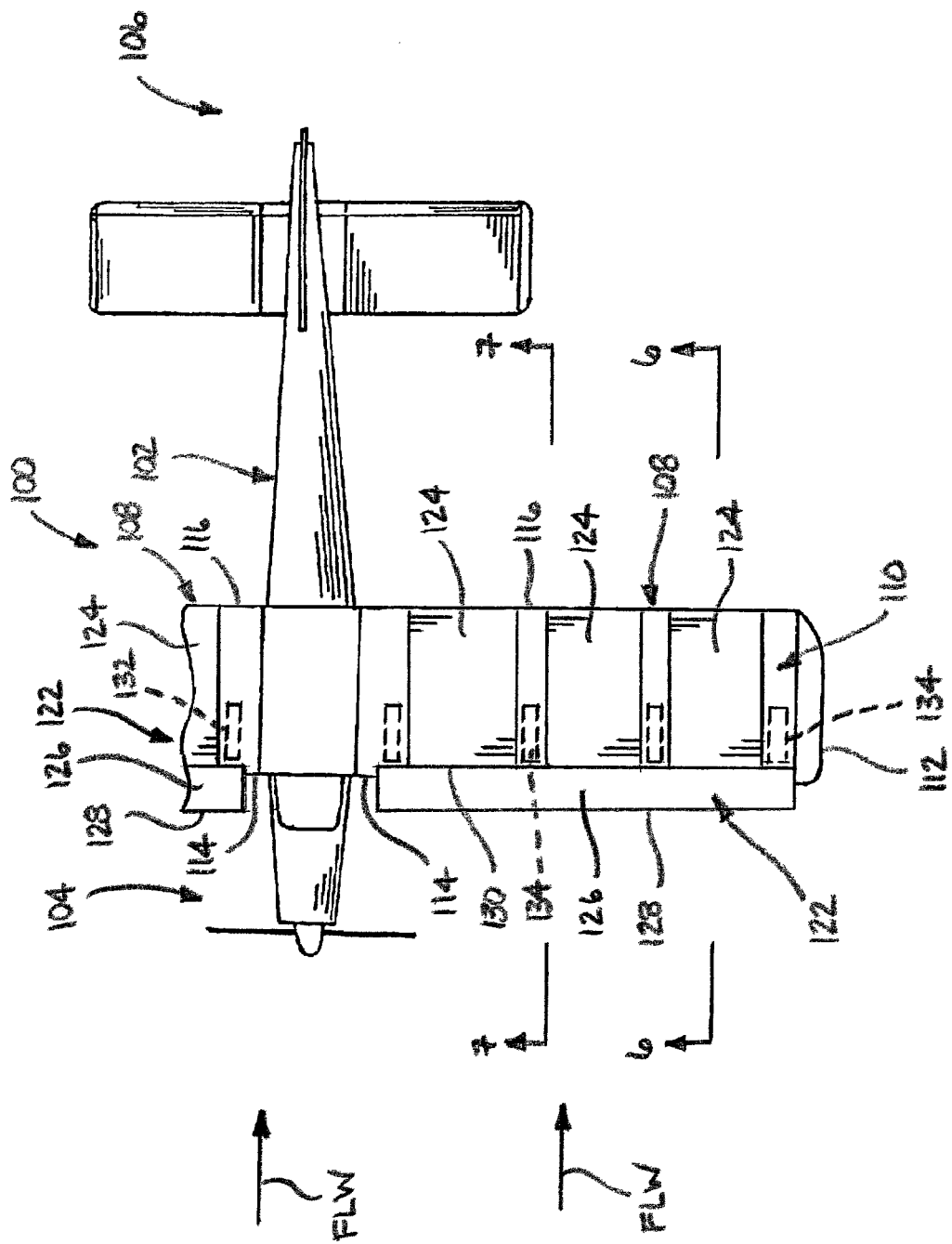
FIG. 2 is a top view of the aircraft in FIG. 1.
Figure 3:
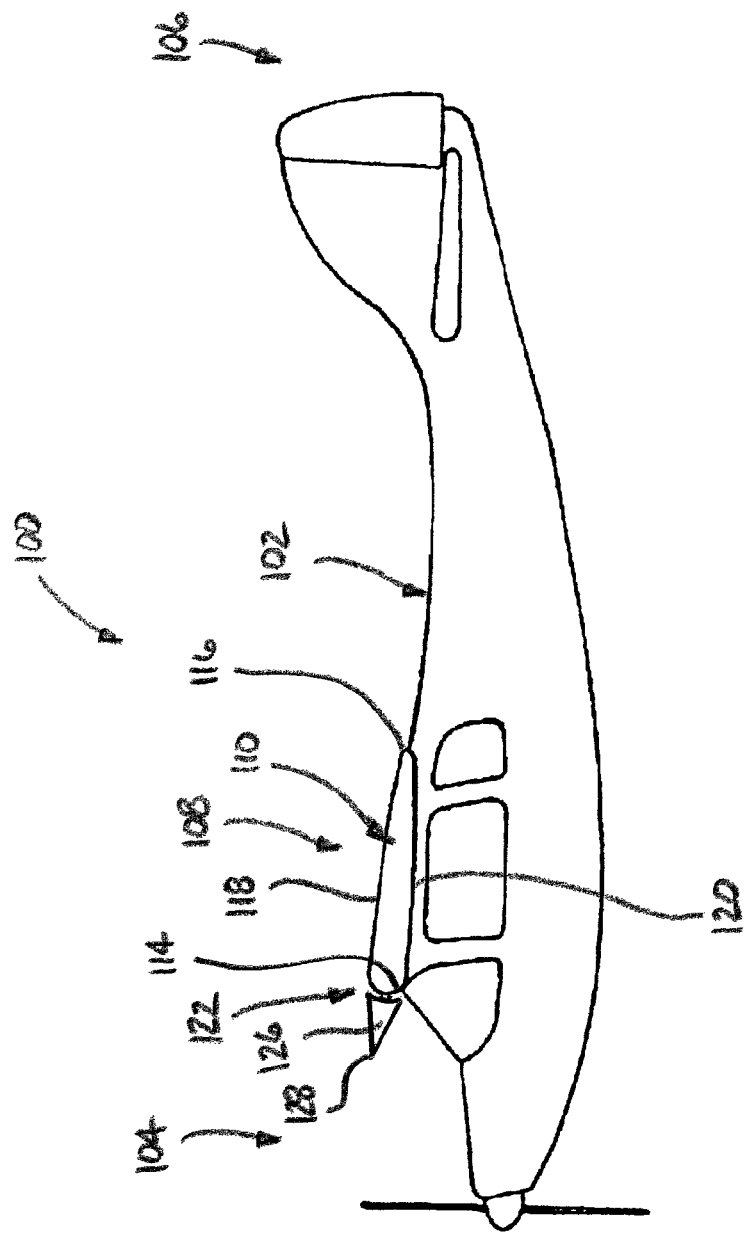
FIG. 3 is a side view of the aircraft in FIGS. 1 and 2.

One example of a fluid interface device in accordance with the subject matter of the present disclosure is embodied in an aircraft 100, which is illustrated in FIGS. 1-3. Aircraft 100 includes a body or fuselage 102 that extends between a front 104 and a rear 106. Additionally, aircraft 100 includes at least one airfoil assembly that is adapted for use in a gaseous fluid such that relative movement between the airfoil assembly and the gaseous fluid can result in a gaseous fluid flow across the airfoil assembly and thereby cause a net force (e.g., lift) to act on the airfoil assembly. In the case of aircraft 100, the at least one airfoil assembly takes the form of two wing sections 108. The wing sections include a wing structure 110, and have a longitudinal length and extend lengthwise in opposing directions from along body 102 toward wing tips 112. Wing sections 108 have a first or leading edge 114 and a second or trailing edge 116 that is spaced laterally from the first edge. Wing sections 108 also include opposing first and second sides 118 and 120, respectively, which extend laterally between the leading and trailing edges of the wing sections. In cross section, first side 118 will normally have a longer lateral length than second side 120. As is well understood, such a cross-sectional shape will result in a net lifting force being generated along the wing sections as the wing sections undergo relative movement with a gaseous fluid, which movement is represented in FIGS. 2 and 3 by arrow FLW.

It will be appreciated that wing sections 108 can be secured to the body in any suitable manner. As such, it will be understood that the aircraft and wing configuration illustrated in FIGS. 1-3 is merely one example of a possible configuration and is not intended to be in any way limiting.

An airfoil assembly in accordance with the subject matter of the present disclosure can also include a fluid interface device that includes one or more surfaces that are capable of moving laterally along at least a portion of at least one of the sides of the airfoil assembly. It will be appreciated that any suitable number of movable surfaces can be used, such as a quantity of from 1 to 50 movable surfaces, for example, such as may depend on the size, shape, configuration and/or desired performance characteristics of the airfoil assembly. Additionally, the one or more movable surfaces can take any suitable form or configuration. As one example, the one or more movable surfaces could take the form of one or more movable bands that are supported on or along the airfoil assembly.

Furthermore, a fluid interface device of an airfoil assembly in accordance with the subject matter of the present disclosure can further include one or more edge extensions that are disposed along the leading edge of the airfoil structure (e.g., wing structure 110). In some cases, the one or more edge extensions can be fixedly secured on or along the airfoil structure. In other cases, the one or more edge extensions can be displaceable relative to the airfoil structure, such as by being rotatable about a longitudinal axis extending lengthwise along the airfoil structure. Additionally, in some cases, a plurality of edge extensions can be used on or along an airfoil structure, such as from 2 to 50 edge extensions, for example, such as may depend upon the size, shape, configuration and/or desired performance characteristics of the airfoil structure. Furthermore, or in the alternative, one edge extension can extend lengthwise across two or more movable surfaces.

In the exemplary arrangement shown in FIGS. 1-3, aircraft 100 is shown as including a plurality of fluid interface devices 122 that include a plurality of movable bands 124 moveably supported on or along the wing structure and disposed in spaced relation to one another along the longitudinal length of wing sections 108. In some cases, movable bands 124 can take the form of endless bands of a material or combination of materials. It will be recognized and appreciated that plurality of movable bands 124 include outer surfaces that move as the movable bands are displaced, and may be alternately referred to herein as movable surfaces 124. Fluid interface devices 122 also include at least one edge extension 126 extending lengthwise along wing sections 108. In a preferred arrangement, edge extensions 126 are disposed adjacent leading edge 114 of wing sections 108. Edge extensions 126 can include a forward or leading edge 128 and one or more rearward or trailing edges 130 and 132 disposed in laterally spaced relation to forward edge 128. In a preferred arrangement, edge extensions 126 are disposed along wing sections 108 such that forward edge 128 is disposed in spaced relation to leading edge 114 in an upstream direction relative to fluid flow FLW and such that rearward edges 130 and/or 132 are disposed adjacent movable surfaces 124 and/or wing structure 110.

Additionally, it will be appreciated that edge extensions 126 can be supported on or along wing structure 110 in any suitable manner. As one example, the one or more edge extensions could be attached to the wing structure in a fixed position. As another example, one or more of edge extensions 126 could be pivotally attached to wing structure 110 such that one or more of the edge extensions can be pivoted, rotated or otherwise displaced relative to one or more features of the wing structure, such as leading edge 114, trailing edge 116 and/or one or more of surfaces 118 and 120. In some cases, fluid interface device 122 can include one or more actuators 134 that can be operatively associated with one or more of edge extensions 126, such that the one or more edge extensions can be pivoted, rotated or otherwise displaced relative to the wing structure.

Figure 4:
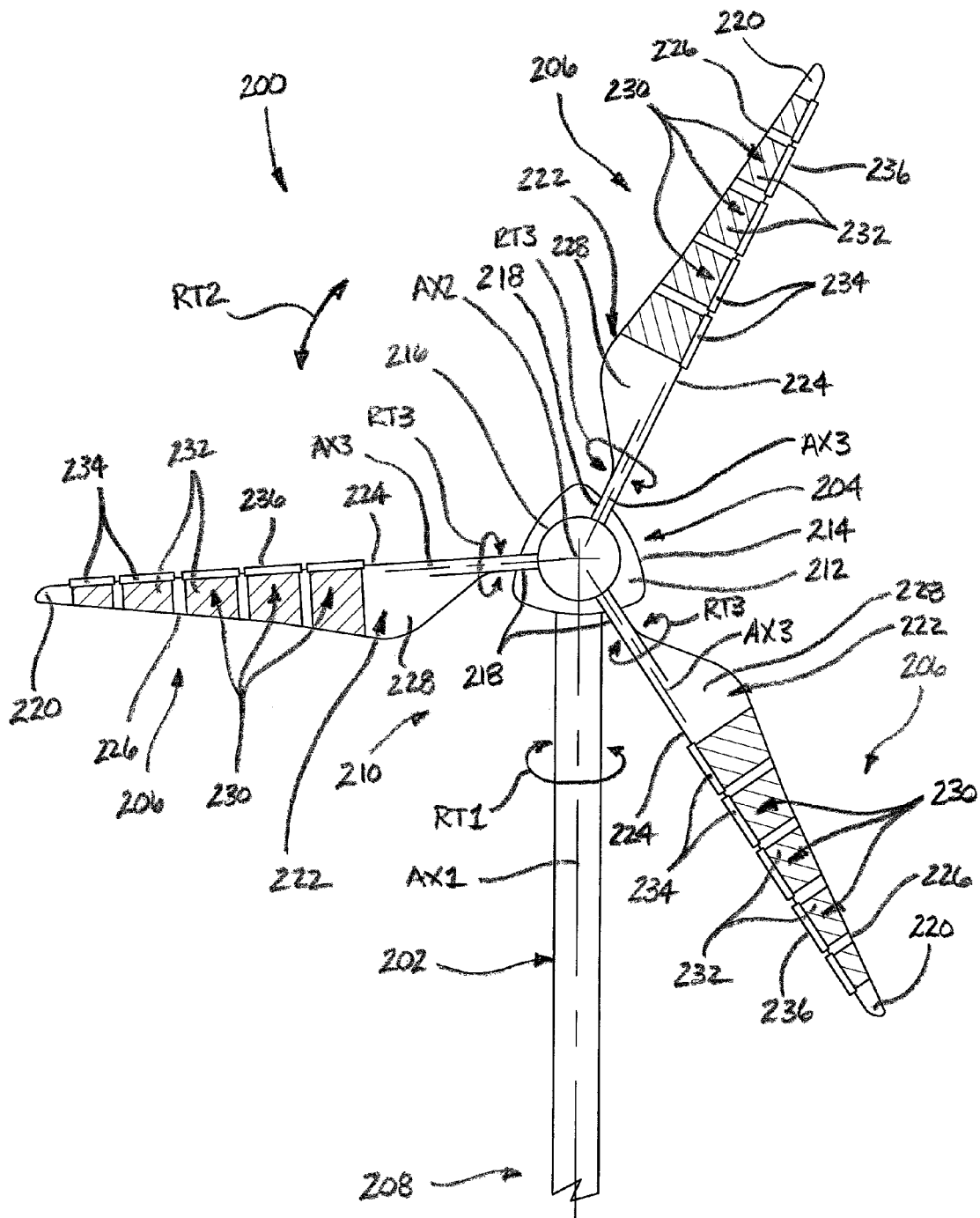
FIG. 4 is a front view of a wind turbine that includes a plurality of blades with another example of a fluid interface device in accordance with the subject matter of the present disclosure that includes a plurality of movable bands and a plurality of edge extensions.

Another example of a fluid interface device in accordance with the subject matter of the present disclosure is embodied in a wind turbine 200, which is illustrated in FIG. 4. Wind turbine 200 includes a support or base structure 202, a turbine body 204 that is supported on the base structure, and at least one turbine blade assembly that is operatively connected to the turbine body. In the exemplary embodiment shown in FIG. 4, a plurality of turbine blade assemblies 206 is shown as being operatively connected to turbine body 204. It will be appreciated that any suitable number of turbine blade assemblies can be supported on the turbine body, such as from one (1) to nine (9) turbine blade assemblies, for example.

Support or base structure 202 is shown in as having an approximately-straight configuration extending longitudinally between a first or lower end 208 and a second or upper end 210. It will be appreciated that the base structure can be of any type, kind, configuration and/or construction suitable for supporting turbine body 204 and the one or more turbine blade assemblies at a suitable elevation above a supporting foundation (not shown), and that base structure 202 is merely one example of a base structure that could be used. Additionally, it will be appreciated that a wind turbine in accordance with the subject disclosure can be installed at any suitable geographic location. As such, the supporting foundation could, without limitation, be a solid foundation supported by the ground, a floating structure on a body of water or even a rooftop (or other elevated portion) of a building or other structure.

Base structure 202 is shown in as including a longitudinally-extending axis AX1 extending between the first and second ends thereof. Turbine body 204 is shown as being supported on second end 210 and, in a preferred arrangement, is operatively connected to base structure 202 such that the turbine body can be rotated about axis AX1, as is represented in FIG. 4 by arrow RT1. In this manner, the turbine body and the one or more turbine blade assemblies supported thereon can be favorably oriented with respect to the direction of the wind. It will be recognized that the favorable orientation of a turbine body and one or more turbine blade assemblies of a wind turbine is generally well understood in the art and that any suitable arrangement and/or system can be used to control the orientation of the turbine body and one or more turbine blade assemblies about axis AX1.

Turbine body 204 includes a first or front end 212, a second or tail end (not shown) and a longitudinal axis AX2 that extends generally between the front and tail ends (i.e., in a direction into the drawing sheet). Turbine body 204 can be oriented in a lengthwise-direction with respect to the wind direction, which will generally have a direction into the drawing sheet, such that front end 212 and turbine blade assemblies 206 are facing in an upstream direction and the tail end (not shown) of the turbine body is disposed in a downstream direction. It will be appreciated, however, that other configurations and/or constructions of wind turbines may operate in a different manner.

Turbine body 204 also includes a first body portion 214 that is supported on the base structure for rotation about axis AX1, as described above, and a second body portion 216 that is supported on the first body portion for rotation about axis AX2. It will be appreciated that second body portion 216 can be supported on first body portion 214 in any suitable manner, such as may be known by those of skill in the art.

A plurality of turbine blade assemblies 206 are operatively connected to second body portion 216 of turbine body 204 for rotation therewith about axis AX2. In general, kinetic energy from air currents (i.e., wind) acting on turbine blade assemblies 206 cause the turbine blade assemblies to impart rotational motion to second body portion 216 of the turbine body. As such, the turbine blade assemblies together with the second body portion of the turbine body rotate about axis AX2, as indicated by arrow RT2.

Additionally, turbine blade assemblies 206 extend radially-outwardly from second body portion 216 between a first or proximal end 218 and a second or distal end 220. A longitudinal axis AX3 extends generally between the proximal and distal ends. In one preferred embodiment, the turbine blade assemblies can be supported on second body portion 216 for rotation about axes AX3, respectively of each turbine blade assembly, as is generally indicated by arrows RT3. Rotation of the turbine blade assemblies about axes AX3 permits favorable orientation of the turbine blade assemblies with respect to the direction of the wind, as is well understood by those of skill in the art. Additionally, it will be appreciated that any suitable arrangement and/or control system can be used to selectively adjust the orientation of the turbine blade assemblies about axes AX3.

Turbine blade assemblies 206 can include a turbine blade structure 222 that includes a first or leading edge 224 extending longitudinally along the turbine blade structure and second or trailing edge 226 that extends longitudinally along the turbine blade structure in laterally-spaced relation to the leading edge. Trailing edge 226 is shown as being disposed at an angle relative to leading edge 224, such that a portion of the turbine blade nearer to distal end 220 will have a lesser lateral dimension than a portion of the turbine blade nearer to proximal end 218. As one example, such an arrangement could be due to the turbine blade structure (or a wing structure) being tapered in the lateral direction or, as another example, due to the turbine blade structure being twisted along the longitudinal length thereof.

Turbine blade structure 222 also includes a first side 228 and an opposing second side (not shown) that extend laterally between the leading and trailing edges of the turbine blade structure. Depending upon factors such as the shape of the turbine blade assembly, the direction of rotation of the turbine blade assembly about axis AX2 and the angle at which the turbine blade assembly is disposed about axis AX3, one of the first and second sides of the turbine blade may be referred to as a pressure side with the other of the first and second sides being referred to as the suction side of the turbine blade assembly.

As described above, an airfoil assembly (e.g., turbine blade assemblies 206) in accordance with the subject matter of the present disclosure can also include a fluid interface device that includes one or more surfaces that are capable of moving laterally along at least a portion of at least one of the sides of the airfoil assembly. It will be appreciated that any suitable number of movable surfaces can be used, such as a quantity of from 1 to 50 movable surfaces, for example, depending upon the size, shape, construction and/or desired performance characteristics of the airfoil assembly. Additionally, the one or movable surfaces can take any suitable form or configuration. As one example, the one or more movable surfaces could take the form of one or more movable bands that are supported on or along the airfoil assembly.

Furthermore, a fluid interface device of an airfoil assembly in accordance with the subject matter of the present disclosure can include one or more edge extensions that are disposed along the leading edge of the airfoil structure (e.g., a turbine blade structure). In some cases, the one or more edge extensions can be fixedly secured on or along the airfoil structure. In other cases, the one or more edge extensions can be displaceable relative to the airfoil structure, such as by being rotatable about a longitudinal axis extending lengthwise along the airfoil structure. Additionally, in some cases, a plurality of edge extensions can be used on or along an airfoil structure, such as from 2 to 50 edge extensions, for example, such as may depend upon the size, shape, configuration and/or desired performance characteristics of the airfoil structure, and/or the size, shape, arrangement and/or configuration of the one or more movable surfaces. Furthermore, or in the alternative, one edge extension can extend lengthwise across or otherwise span two or more movable surfaces.

In the arrangement illustrated in FIG. 4, turbine blade assemblies 206 are shown as including a plurality of fluid interface devices 230 that include at least one surface that is disposed along at least one side of the turbine blade and is movable relative to the side of the turbine blade structure. During use in operation, the relative speed of the movable surface with respect to the wind can differ from what the relative speed of the wind would be along the side of the turbine blade structure at that same longitudinal location in the absence of the movable surface. Such differences in relative speed can favorably influence the efficiency and/or performance characteristics of airfoil assemblies (e.g., wing structure 108 and turbine blade assemblies 206), such as has been discussed above.

In FIG. 4, fluid interface devices 230 are shown as including a plurality of movable bands 232 that are moveably supported on the turbine blade structure and are disposed in spaced relation to one another along the longitudinal length of turbine blade assemblies 206. It will be recognized and appreciated that plurality of movable bands 232 include outer surfaces that move as the movable bands are displaced, and that such outer surfaces may be alternately referred to herein as movable surfaces 232. In a preferred arrangement, movable bands 232 extend along at least one side of the turbine blade structure and are movable in a direction along that at least one side that is transverse (e.g., perpendicular) to longitudinal axis AX3.

Fluid interface devices 230 also include at least one edge extension 234 that extend lengthwise along turbine blade assemblies 206. In a preferred arrangement, edge extensions 234 are disposed adjacent leading edge 224 of turbine blade structures 222. Edge extensions 234 can include a forward or leading edge 236 and one or more rearward or trailing edges (not numbered), such as have been described above as edges 130 and 132, for example, disposed in laterally spaced relation to forward edge 236. In a preferred arrangement, edge extensions 234 are disposed along turbine blade assemblies 206 such that forward edge 236 is disposed in spaced relation to leading edge 224 in an upstream direction relative to fluid flow (i.e., in a direction into the drawing sheet) and such that the rearward edges (e.g., edges 130 and/or 132) are disposed adjacent movable surfaces 232 and/or turbine blade structure 222.

Additionally, it will be appreciated that edge extensions 234 can be supported on or along turbine blade structure 222 in any suitable manner. As one example, the one or more edge extensions could be attached to the turbine blade structure in a fixed position. As another example, one or more of the edge extensions could be pivotally attached to the turbine blade structure such that one or more of the edge extensions can be pivoted, rotated or otherwise displaced relative to one or more features of the turbine blade structure. In some cases, fluid interface devices 230 can include one or more actuators (e.g., actuators 134) that can be operatively associated with one or more of edge extensions 234, such that the one or more edge extensions can be pivoted, rotated or otherwise displaced relative to the turbine blade structure.

It will be appreciated that each of the plurality of movable bands described above (e.g., movable bands 124 and 232) can have one of two or more different widths, lengths and/or shapes, such as may be due, at least in part, to the shape and/or configuration of associated airfoil structure. For example, two or more of the movable bands can have different nominal widths and/or lengths. In other cases, however, it will be appreciated that two or more of the plurality of movable bands can, optionally, have the same length and/or width dimensions.

It will be appreciated that the one or more movable surfaces disposed along an airfoil structure can be operatively secured thereto in any suitable manner. For example, if one or more movable bands are used to form the at least one movable surface, it will be appreciated that the one or more movable bands can be supported on the airfoil structure in any suitable manner and can include any suitable components and/or devices for permitting the one or more movable bands to be conveyed along at least one side of the airfoil structure. For example, one arrangement could utilize a first support element disposed toward the leading edge of the airfoil structure and a second support element disposed in laterally-spaced relation to the first support element toward in a direction toward the trailing edge of the airfoil structure. The one or more movable bands can then be supported between these laterally-spaced support elements.

Figure 5:
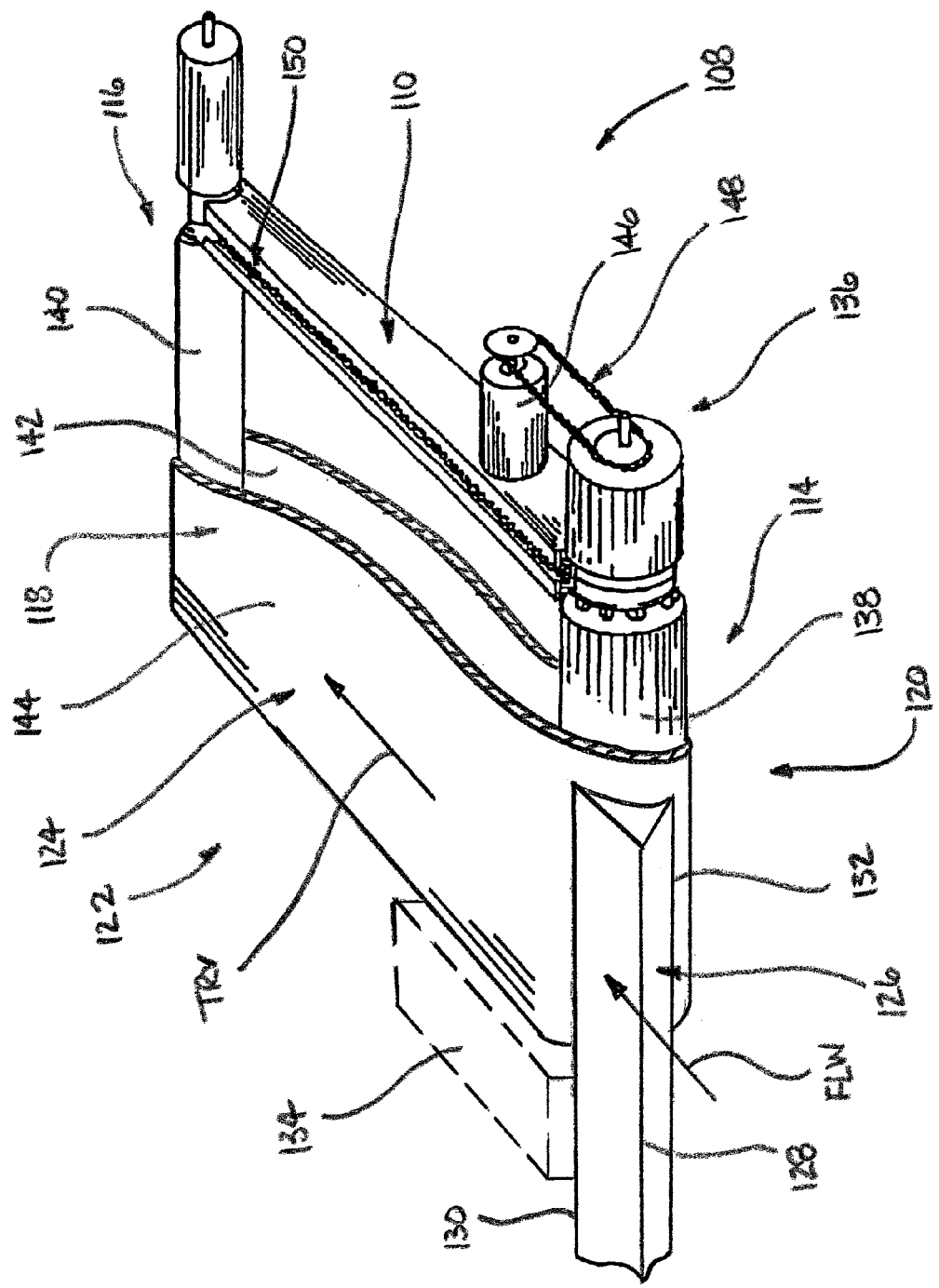
FIG. 5 is a cut away perspective view of a portion of an airfoil assembly including a fluid interface device in accordance with the subject matter of the present disclosure that includes a movable band and a portion of an edge extension.
Figure 6:
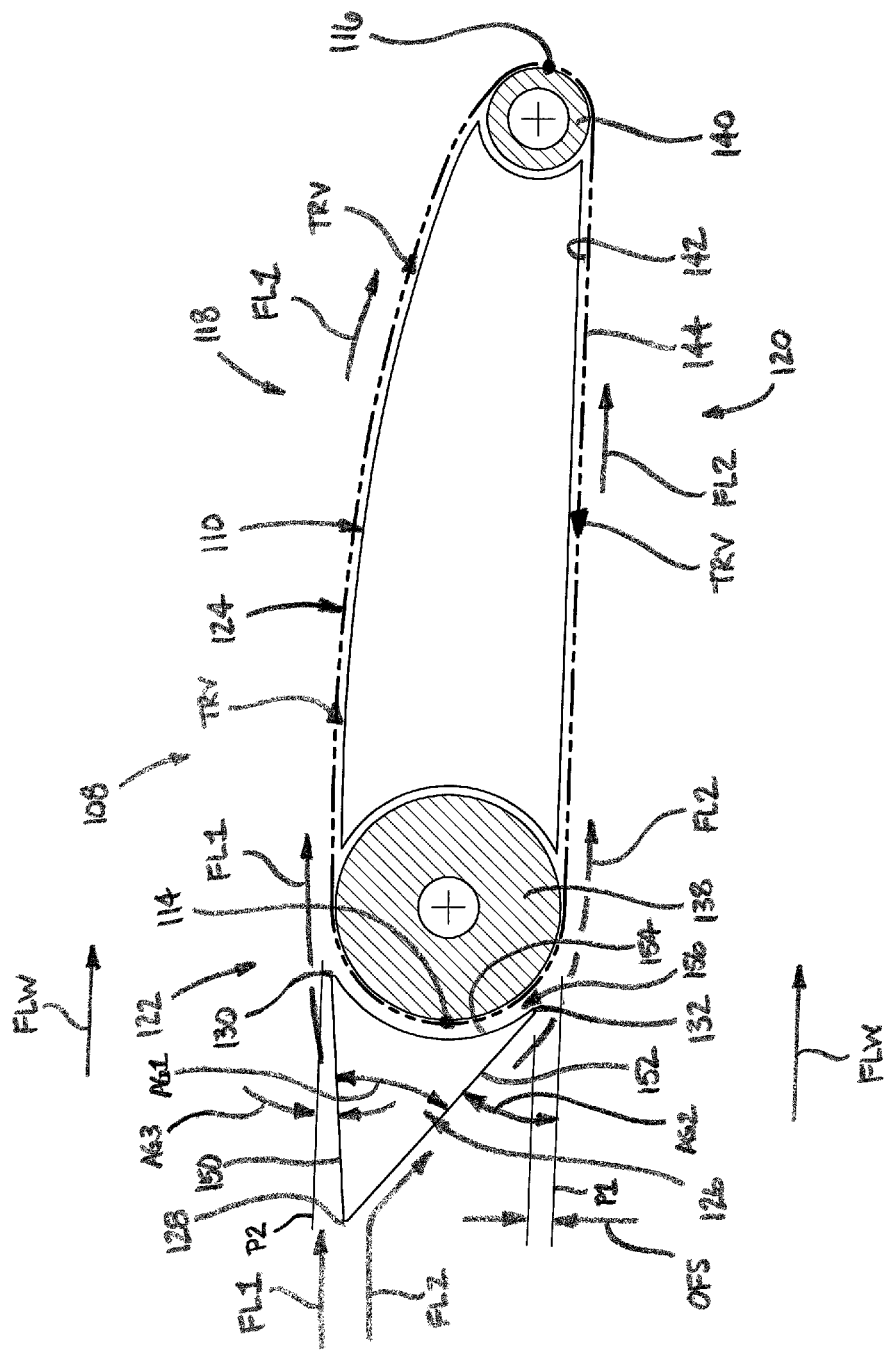
FIG. 6 is a schematic representation of a cross-sectional side view of the exemplary fluid interface device in FIGS. 1-3 taken from along line 6-6 in FIG. 2 illustrating a movable band and an edge extension.
Figure 7:
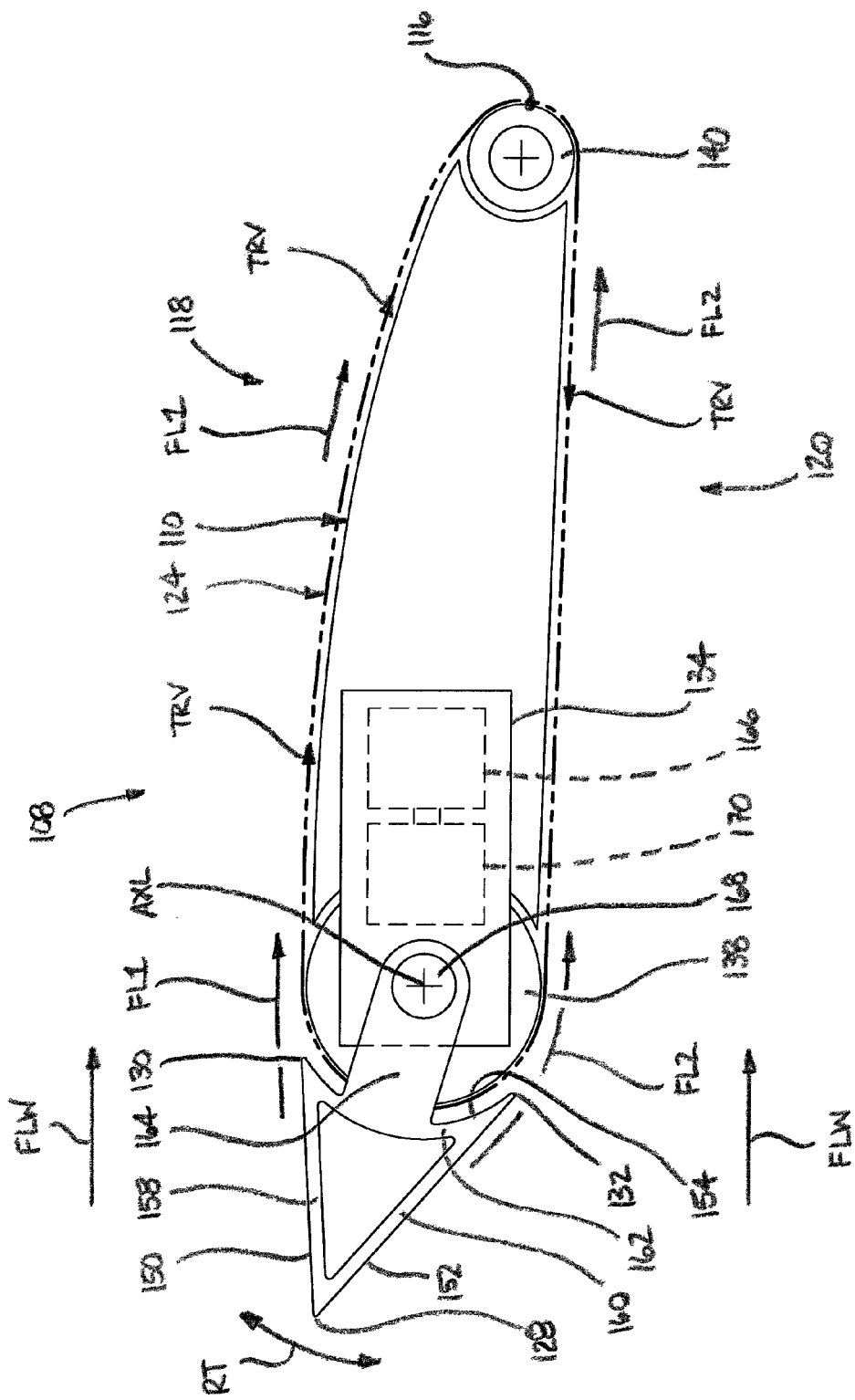
FIG. 7 is a schematic representation of a cross-sectional side view of the exemplary fluid interface device in FIGS. 1-3 taken from along line 7-7 in FIG. 2 illustrating a movable band, an edge extension and an extension actuator.

FIGS. 5-7 illustrate in additional detail certain features, elements, components and/or systems of a fluid interface device associated with an airfoil structure, such as fluid interface devices 122 of wing assemblies 108 and/or fluid interface devices 230 of turbine blade assemblies 206, for example. For convenience and ease of reading, additional and specific reference will be made to wing sections 108 and fluid interface devices 122 thereof. It is to be recognized and understood, however, that the following discussion of wing sections 108 and fluid interface devices 122 is equally applicable to other fluid interface devices and associated airfoil structures in accordance with the subject matter of the present disclosure, including but not limited to fluid interface devices 230 of turbine blade assemblies 206.

With further reference, now, to FIGS. 5-7, wing section 108 includes an airfoil structure (e.g., wing structure 110) and a drive assembly 136 that is supported on the wing structure and operative to move or otherwise displace one or more of movable bands 124. Also identified in FIGS. 5-7 are leading edge 114, trailing edge 116, first side 118 and second side 120. A first roller 138 can be disposed adjacent leading edge 114 and a second roller 140 can be disposed adjacent trailing edge 116. Movable band 124 is operatively connected between the first and second rollers such that rotation of the rollers results in movable band 124 being conveyed or otherwise displaced along at least one of the first and second sides of the airfoil assembly. In the arrangement shown in FIGS. 5-7, movable band 124 is displaced along both the first side and the second side of wing structure 110. It will be appreciated, however, that other arrangements can additionally, or alternately, be used, such as arrangements in which a movable band is outwardly exposed along only one of the first and second sides.

Movable bands 124 have an inner surface 142 disposed toward and abuttingly engaging rollers 138 and 140, and an outer surface 144 that interfaces with the fluid, which is indicated as moving relative to the airfoil assembly in direction represented by arrow FLW in FIGS. 2 and 5-7. Movable bands 124 can be displaced relative to airfoil structure 110 in any suitable manner and through the use of any suitable configuration of components and/or systems. For example, first roller 138 is shown as being a primary or drive roller that is operatively connected to a rotational motion source, such as a motor 146, for example, in a suitable manner, such as by way of power transmission belt and pulley arrangement 148, for example. In some case, second roller 140 can be an unpowered or idler roller that rotates as a result of the movement of movable band 124, which can be tensioned or otherwise operatively connected between the first and second rollers. A guide track 150 or other alignment maintaining arrangement can, optionally, be included to assist with tracking of the endless belt during displacement along the airfoil structure. During use, movable band 124 can be displaced around and/or along airfoil structure 110 in the direction represented by arrow TRV. As such, it will be recognized that outer surface 144 of movable band 124 moves along first side 118 in the direction of fluid flow FLW and moves along second side 120 in the direction opposite fluid flow FLW.

It will be appreciated that an edge extension in accordance with the subject matter of the present disclosure can be of any suitable configuration and/or construction, and can be formed from any suitable material or combination of materials, such as metals, polymers and/or composite materials, for example. As identified in FIGS. 6 and 7, edge extension 126 can include a first or upper surface 150 and a second or lower surface 152. The upper surface extends lengthwise along the edge extension and laterally between forward edge 128 and rearward edge 130. The lower surface extends lengthwise along the edge extension and laterally between forward edge 128 and rearward edge 132. In some cases, forward edge can be formed adjacent a constructive intersection between first and second surfaces 150 and 152. In a preferred arrangement, rearward edges 130 and 132 are disposed in spaced apart relation to one another such that edge extension 126 has a somewhat triangular or wedge-shaped cross-section. As such, first and second surfaces 150 and 152 are disposed at an included angle relative to one another, as is represented in FIG. 6 by reference dimension AG1. In a preferred arrangement, angle AG1 is an acute angle having a value within a range of from approximately 5 degrees to approximately 85 degrees. In a more preferred arrangement, angle AG1 can have a value within a range of from approximately 30 degrees to approximately 60 degrees.

In some cases, edge extension 126 can include a third or connector surface 154 that extends lengthwise along at least a portion of the edge extension and heightwise between rearward edges 130 and 132. In a preferred arrangement, connector surface 154 can have a cross-sectional shape or profile that is complimentary to the curvature of movable band 124 along leading edge 114, and can be supported in spaced relation to the movable band such that a slot or passage 156 can be formed between connector surface 154 and outer surface 144 of movable band 124.

The inclusion of one or more edge extensions in forming a fluid interface device in accordance with the subject matter of the present disclosure will or is expected to provide one or more of a variety of performance benefits. Generally, the edge extensions are positioned in front of the leading edge of the associated airfoil structure, and preferably include a forward or leading edge that has a reduced cross-sectional profile in comparison with the profile of the leading edge of the associated airfoil structure, which may include a curved outer surface of a movable band. Such a reduced cross-sectional profile will permit fluid flow FLW to meet an edge having a reduced or at least minimized surface area, rather than the larger surface area associated with a conventional leading edge. In this manner, such a construction is expected to improve performance by reducing resistance or drag as fluid flow engages the leading edge of the edge extension.

In a preferred arrangement, the cross-sectional profile of the forward edge of the edge extension can have a curvature that is less than 20 percent of the curvature of the leading edge of the airfoil structure. In a more preferred arrangement, the cross-sectional profile of the forward edge of the edge extension can have a curvature that is less than 10 percent of the curvature of the leading edge of the airfoil structure. And, in an even more preferred arrangement, the cross-sectional profile of the forward edge of the edge extension can have a curvature that is less than 5 percent of the curvature of the leading edge of the airfoil structure. In some cases, the forward edge of the edge extension can have a pointed or sharp profile, which may be particularly advantageous.

It will be appreciated that the various performance characteristics and/or benefits that may be obtained through the use of a fluid interface device in accordance with the subject matter of the present disclosure may be influenced by the shape and/or orientation of the edge extension relative to one or more features of the airfoil structure and/or the configuration of the movable band. In cases in which the edge extension is secured in fixed relation to the airfoil structure, it may be desirable to configure the wedge-shaped profile of the edge extension, such as is represented by reference dimension AG1, and/or orient the edge extension relative to one or more features of the airfoil structure or movable band to optimize performance characteristics for one or more desired usage conditions. As one example, it may be desirable to optimize the wedge-shaped profile and/or orientation of the edge extension to maximize or at least improve soaring time of an unmanned aerial vehicle.

It will be appreciated that the edge extension can be oriented or otherwise positioned relative to any one or more features of the airfoil structure (e.g., a chord) and/or the movable band (e.g., a tangent plane). In some cases, one or more surfaces of the edge extension can be oriented relative to an approximately planar surface disposed along the bottom side of the airfoil structure (e.g., bottom side 120), such as is represented in FIG. 6 by line P1, for example. As identified in FIG. 6, second surface 152 of edge extension 126 can be disposed at an angle relative to planar surface P1, as is represented by reference dimension AG2. Additionally, or in the alternative, first surface 150 of edge extension 126 can be disposed at an angle relative to a reference plane P2 that is disposed in approximate alignment with planar surface P1, as is represented in FIG. 6 by reference dimension AG3. In a preferred arrangement, angle AG2 can have a value within a range of from approximately 20 degrees to approximately 70 degrees. And, angle AG3 can, in a preferred arrangement, have a value within a range of from approximately 1 degree to approximately 5 degrees.

It will be appreciated that the edge extensions can be secured on or along the airfoil structure in any suitable manner. As one example, edge extension 126 is shown in FIG. 7 as having a hollow construction that is at least partially formed by a first or upper wall portion 158, a second or lower wall portion 160 and a third or connector wall portion 162. A mounting wall 164 can extend outwardly from connector wall portion 162 in a direction opposite forward edge 128. In practice, two or more mounting walls (only one of which is shown) can be spaced apart from one another in the lengthwise direction along the edge extension. In this manner, the opposing ends and, optionally, one or more intermediate portions of the edge extension can be secured on or along the airfoil structure. It will be appreciated, however, that other configurations and/or arrangements could alternately be used.

In some cases, the edge extension can be rotatably, pivotally or otherwise displaceably secured on or along the airfoil structure, as mentioned above. In such cases, the orientation of the edge extension relative to the airfoil structure can be varied to provide the desired performance characteristics as usage conditions change. It will be appreciated that the edge extension can be displaced or otherwise adjusted in any suitable manner and through the use of any suitable system or device. As one example, mounting wall 164 is shown in FIG. 7 as being operatively connected to actuator 134 and can be pivotally displaced about a longitudinal axis AXL, as is represented by arrow RT. It will be appreciated that actuator 134 can be of any suitable type, kind, configuration and/or construction. As one example, actuator 134 can include a rotational motion source 166, such as an electric motor, a hydraulic motor or a pneumatic motor, for example. The rotational motion source can be operatively connected to an output shaft 168 by way of a gearbox, clutch and/or brake assembly 170. It will be appreciated, however, that other configurations and/or arrangements could alternately be used.

As indicated above, the inclusion of one or more edge extensions in forming a fluid interface device in accordance with the subject matter of the present disclosure will or is expected to provide one or more of a variety of performance benefits. Another of such performance improvements can relate to the orientation of second surface 152 of edge extension 126. In particular, edge extension 126 can be configured such that a second surface 152 is oriented at a substantially greater angle than first surface 150. As a result, the second surface of the edge extension extends in an upward direction and can produce lift from an angle of attack action by engaging on coming fluid flow at an angle.

A further performance improvement that is anticipated due to the inclusion of one or more edge extensions in forming a fluid interface device in accordance with the subject matter of the present disclosure relates to the direction of oncoming fluid flow toward the upper and lower surfaces of the movable band. In particular, a pointed or sharp forward edge 128 of edge extension 126 can separate oncoming fluid flow, and can direct a first portion of the fluid flow along first side 118 of the airfoil structure, as is represented by arrows FL1, while directing a second portion of the fluid flow across second surface 152 and along a second side 120 of the airfoil structure, as is represented by arrows FL2 in FIG. 6.

Still another performance improvement that can, optionally, be obtained due to the inclusion of one or more edge extensions in forming a fluid interface device in accordance with the subject matter of the present disclosure can relate to the fluid flow attached as a boundary layer along the outer surface of the movable band as the band travels along the second side of the airfoil structure. In some arrangements, rearward edge 132 can be offset or otherwise spaced from planar surface P1, as is represented in FIG. 6 by reference dimension OFS. In such case, it is anticipated that the boundary layer will follow the movable band as the movable band engages first roller 138 and begins to conform to the shape of the first roller. In such case, this action is expected to generate fluid flow along a second surface 152 of edge extension 126 and thereby contribute to lift.

It will be appreciated that the influence a given movable surface and/or edge extension may have on an airfoil assembly may vary depending upon the position of the movable surface and/or edge extension along the longitudinal length of the airfoil assembly as well as other features and characteristics of the movable surface and/or edge extension, such as the size, shape, configuration and/or arrangement of the airfoil structure, the movable band that forms the movable surface and/or the edge extension, for example. As a result, it will be appreciated that it may be desirable to utilize fluid interface devices that vary from one another along the length of the associated airfoil structure.

The at least one movable surface operatively disposed on or along an airfoil assembly, such as one of movable bands 124 and/or 232, for example, can be formed from any suitable material or combination of materials, such as metal, plastic and/or fabric, for example. Metal material could include stainless steel sheet, for example. Plastic material could include any suitable polymeric film, such as polyester film, for example. Fabric material could include any suitable elastomeric or non-elastomeric, woven or non-woven material having one or more plies formed of filaments of one or more types and/or kinds of material, such as a stainless steel mesh, for example.

Figure 8:
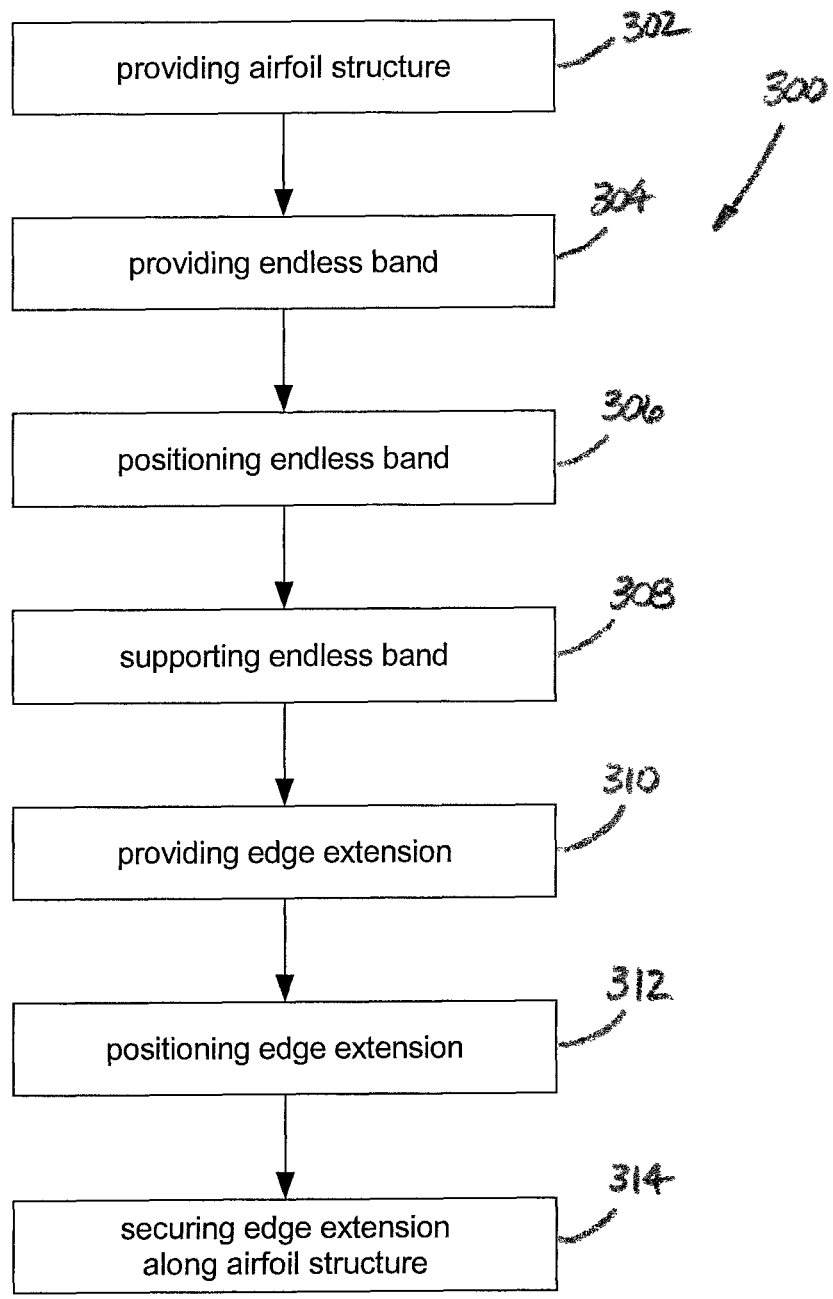
FIG. 8 is a graphical representation of one example of a method of assembling an airfoil assembly including a fluid interface device in accordance with the subject matter of the present disclosure that includes at least one movable band and at least one edge extension.

With reference to FIG. 8, one example of a method 300 of assembling an airfoil assembly in accordance with the subject matter of the present disclosure is shown and can include providing an airfoil structure, such as one of wing structure 110 or a turbine blade structure 222, for example, such as is represented in FIG. 8 by referenced number 302. Method 300 can also include providing a movable band, such as one of bands 124 or 232, for example, such as is represented by reference number 304. The method can also include orienting the movable band such that a first band width extends longitudinally along the airfoil structure and supporting the movable band on the airfoil structure such that a first outer surface is exposed along at least a portion of at least one of the first and second sides of the airfoil structure, such as is represented in FIG. 8 by reference numbers 306 and 308, respectively.

Method 300 can also include providing an edge extension, such as one of edge extensions 126 or 234, for example, as is represented by reference number 310. The method can further include positioning the edge extension along a leading edge of the airfoil structure, such as along a curvature of the movable band, for example, as is represented in FIG. 8 by reference number 312. Method 300 can also include securing the edge extension on or along the airfoil structure, as is represented in by reference number 314.

It will be recognized that airfoils, such as aircraft wings and turbine blades, for example, of a wide variety of different sizes, shapes, configurations and constructions have been developed, and that all such variations could not be shown and/or described in the subject disclosure. For example, aircraft wings and turbine blades have been developed that include straight edges, tapered edges, curved edges, approximately planar sides, curved sides, symmetrically-shaped sides and asymmetrically-shaped sides. Additionally, some turbine blades are twisted along the longitudinal length thereof such that the wind contacts the turbine blade at different angles at different points along the longitudinal extent of the turbine blade. Notwithstanding all of the many variations of turbine blades, it is to be understood that the subject matter of the present disclosure is broadly capable of use on or otherwise in association with aircraft wings and turbine blades of any suitable type, kind, configuration and/or construction. As such, it is to be understood that the type, kind, size, shape, construction, configuration and/or arrangement of aircraft wings and turbine blades shown and described herein are merely exemplary and not intended to be limiting.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An airfoil assembly for use in a gaseous fluid, said airfoil assembly comprising:
   an airfoil structure having a longitudinal length and including a first longitudinal edge, a second longitudinal edge spaced laterally from said first longitudinal edge, a first side extending longitudinally along at least a portion of said longitudinal length between said first and second longitudinal edges, and a second side extending longitudinally along at least a portion of said longitudinal length between said first and second longitudinal edges and generally opposite said first side; and,
   a fluid interface device operatively associated with said airfoil structure, said fluid interface device including:
      a movable band having a width and supported on said airfoil structure such that at least a portion of said movable band is exposed along at least one of said first and second sides of said airfoil structure; and,
      an edge extension positioned along said first longitudinal edge of said airfoil structure and supported on said airfoil structure for rotational movement about a longitudinal axis extending along and internally within said airfoil structure such that the position of said edge extension is rotatable about said longitudinal axis relative to said airfoil structure, said edge extension including a third longitudinal edge and being positionable upon rotation of said edge extension about said longitudinal axis into approximate alignment with at least a portion of said movable band such that relative movement between said airfoil assembly and a gaseous fluid results in a gaseous fluid flow across said airfoil assembly with said third longitudinal edge of said edge extension functioning as a leading edge of at least a portion of said airfoil assembly.

2. An airfoil assembly according to claim 1, wherein said movable band includes an outer surface, said movable band oriented such that said width extends longitudinally along said airfoil structure, said movable band supported on said airfoil structure such that said outer surface is exposed along at least a portion of at least one of said first and second sides of said airfoil structure and is supported for lateral movement along said at least one of said first and second sides such that a relative velocity is maintained between said outer surface and said at least one of said first and second sides of said airfoil structure.

3. An airfoil assembly according to claim 1, wherein said edge extension has a longitudinal length and extends lengthwise from a first end to a second end that is spaced longitudinally from said first end, said edge extension being supported along said airfoil structure such that said edge extension extends along said first longitudinal edge of said airfoil structure and spans at least said movable band across said width thereof.

4. An airfoil assembly according to claim 1, wherein said edge extension has a cross-sectional shape and in cross section includes a first wall portion, a second wall portion extending from along said first wall portion and a third wall portion extending between and operatively interconnecting said first and second wall portions to at least partially define a hollow construction of said edge extension.

5. An airfoil assembly according to claim 1, wherein said first and second wall portions at least partially define said longitudinal edge of said edge extension.

6. An airfoil assembly according to claim 1, wherein said fluid interface device includes an actuator connected to said edge extension and operative to selectively displace said edge extension about said longitudinal axis.

7. An airfoil assembly according to claim 1, wherein said edge extension includes a first extension surface and a second extension surface disposed at an acute angle relative to said first extension surface such that said edge extension has a wedge-shaped cross-section.

8. An airfoil assembly according to claim 7, wherein a reference plane extends lengthwise along said airfoil structure and is oriented in tangential relation to a feature of at least one of said airfoil structure and said movable band, said third longitudinal edge of said edge extension is a forward edge, and said edge extension includes at least one rearward edge extending longitudinally along said edge extension in laterally spaced relation to said forward edge, said at least one rearward edge disposed in offset relation to said reference plane.

9. An airfoil assembly according to claim 8, wherein said edge extension includes a first rearward edge and a second rearward edge disposed in spaced relation to said first rearward edge with said first and second rearward edges disposed in offset relation to said reference plane.

10. An airfoil assembly according to claim 7, wherein a reference plane extends lengthwise along said airfoil structure and is oriented in relation to a feature of at least one of said airfoil structure and said movable band, and at least one of said first extension surface and said second extension surface is disposed at an acute angle relative to said reference plane.

11. An airfoil assembly according to claim 10, wherein said reference plane is disposed in approximate alignment with a portion of said movable band disposed along said second side of said airfoil structure.

12. An airfoil assembly according to claim 10, wherein said first extension surface is disposed at an angle relative to said reference plane with said angle having a value within a range of from approximately 1 degree to approximately 5 degrees.

13. An airfoil assembly according to claim 10, wherein said second extension surface is disposed at an angle relative to said reference plane with said angle having a value within a range of from approximately 20 degrees to approximately 70 degrees.

14. An airfoil assembly according to claim 7, wherein said third longitudinal edge of said edge extension is formed adjacent a constructive intersection of said first and second extension surfaces.

15. An airfoil assembly according to claim 14, wherein said first longitudinal edge of said airfoil structure has an edge curvature that has a value, and said third longitudinal edge of said edge extension has a cross-sectional profile with an extension curvature that has a value that is 20 percent or less of said value of said edge curvature.

16. An airfoil assembly according to claim 15, wherein said value of said extension curvature is approximately 5 percent or less of said value of said edge curvature.

17. An airfoil assembly according to claim 1, wherein said fluid interface device is one of a plurality of fluid interface devices disposed in longitudinally spaced relation to one another in a lengthwise direction along said airfoil structure.

18. An airfoil assembly according to claim 1, wherein said fluid interface device includes a plurality of movable bands disposed in longitudinally spaced relation to one another in a lengthwise direction along said airfoil structure.

19. An airfoil assembly according to claim 18, wherein said edge extension has a longitudinal length and is supported along said airfoil structure such that said longitudinal length of said edge extension spans two or more of said plurality of movable bands.

20. An airfoil assembly for use in a gaseous fluid, said airfoil assembly comprising:
  an airfoil structure having a longitudinal length and including a longitudinal axis extending lengthwise along and within said airfoil structure, a first longitudinal edge extending longitudinally along said airfoil structure, a second longitudinal edge extending longitudinally along said airfoil structure and spaced laterally from said first longitudinal edge, a first side extending longitudinally along at least a portion of said longitudinal length between said first and second longitudinal edges, and a second side extending longitudinally along at least a portion of said longitudinal length between said first and second longitudinal edges and generally opposite said first side; and,
  a fluid interface device operatively associated with said airfoil structure, said fluid interface device including:
    a movable band having a width and supported on said airfoil structure such that at least a portion of said movable band is exposed along at least one of said first and second sides of said airfoil structure; and,
    an edge extension positioned along said first longitudinal edge of said airfoil structure and supported on said airfoil structure for rotational movement about said longitudinal axis internal to said airfoil structure such that said edge extension is rotatable about said longitudinal axis between a first position in which a first surface of said edge extension is disposed in approximate alignment with said first side of said airfoil structure and a second position in which a second surface of said edge extension opposite said first surface is disposed in approximate alignment with said second side of said airfoil structure, said edge extension including a third longitudinal edge facing away from said movable band such that relative movement between said airfoil assembly and a gaseous fluid results in a gaseous fluid flow across said airfoil assembly with said third longitudinal edge of said edge extension functioning as a leading edge of at least a portion of said airfoil assembly.

* * * * *